(12) United States Patent
Nijboer et al.

(10) Patent No.: US 7,983,118 B2
(45) Date of Patent: Jul. 19, 2011

(54) RECORD CARRIER AND SCANNING DEVICE

(75) Inventors: Jakob Gerrit Nijboer, Eindhoven (NL); Aalbert Stek, Eindhoven (NL); Cornelis Marinus Schep, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 962 days.

(21) Appl. No.: 10/498,960

(22) PCT Filed: Dec. 5, 2002

(86) PCT No.: PCT/IB02/05225
§ 371 (c)(1),
(2), (4) Date: Jun. 16, 2004

(87) PCT Pub. No.: WO03/054864
PCT Pub. Date: Jul. 3, 2003

(65) Prior Publication Data
US 2005/0122851 A1    Jun. 9, 2005

(30) Foreign Application Priority Data
Dec. 21, 2001    (EP) ..................... 01205133

(51) Int. Cl.
*G11B 7/085* (2006.01)

(52) U.S. Cl. ............... 369/30.03; 369/275.3; 369/59.23; 369/59.25

(58) Field of Classification Search ............... 369/30.03, 369/59.25, 47.16, 47.28, 275.3, 47.15, 47.21, 369/53.2, 53.41, 30.12, 30.07; 360/48, 49; 386/106, 125, 126, 98, 123
See application file for complete search history.

(56) References Cited

U.S. PATENT DOCUMENTS

| | | | | |
|---|---|---|---|---|
| 4,641,295 A * | 2/1987 | Furukawa et al. | ......... | 369/30.12 |
| 4,734,901 A * | 3/1988 | Murakami | ................ | 369/59.25 |
| 5,351,132 A * | 9/1994 | Sawabe et al. | ................ | 386/123 |
| 5,363,250 A * | 11/1994 | Lokhoff et al. | ................ | 360/48 |
| 5,655,052 A * | 8/1997 | Nakai et al. | .................... | 386/106 |
| 5,754,508 A * | 5/1998 | Hosoda et al. | ............. | 369/47.16 |
| 5,828,631 A * | 10/1998 | Shimabukuro | ............. | 369/30.07 |
| 6,108,486 A * | 8/2000 | Sawabe et al. | ................. | 386/98 |
| 6,272,081 B1 * | 8/2001 | Murata | ....................... | 369/47.15 |
| 6,434,091 B1 * | 8/2002 | Kuribayashi | ............... | 369/44.13 |
| 6,728,186 B2 * | 4/2004 | Weijenbergh et al. | ..... | 369/59.25 |
| 6,829,211 B2 * | 12/2004 | Sako et al. | ................. | 369/275.3 |

* cited by examiner

*Primary Examiner* — William J Klimowicz
*Assistant Examiner* — Kim-Kwok Chu

(57) ABSTRACT

An optical record carrier (1) includes an area (2) for storing user information and an area (3) for storing control information. The control information is arranged in a block of frames of equal length. The block includes an identification of the total number of frames in the block.

21 Claims, 2 Drawing Sheets

| Byte number | Content | Number of bytes |
|---|---|---|
| 0 | Disc Information identifier = "DI" | 2 |
| 2 | DI format = 00h | 1 |
| 3 | Reserved = 00h | 1 |
| 4 | Number of DI Frames in each DI Block | 1 |
| 5 | DI Frame sequence number in DI Block | 1 |
| 6 | Number of DI bytes in use in this DI Frame | 1 |
| 7 | Reserved = 00h | 1 |
| 8 to 15 | Reserved = All 00h | 8 |
| 16 to 18 | disc type identifier = "DVR" | 3 |
| 19 | disc size / version | 1 |
| 20 | disc structure | 1 |
| 21 | maximum transfer rate of application | 1 |
| 22 | SPZ descriptor / channel bit length | 1 |
| 23 | Reserved = 00h | 1 |
| 24 to 31 | Data Zone allocation | 8 |
| 32 to 35 | Recording velocities | 4 |
| 36 to 39 | Maximum read powers | 4 |
| 40 to 46 | Write power settings at nominal recording velocity | 7 |
| 47 | Reserved = 00h | 1 |
| 48 to 54 | Write power settings at maximum recording velocity | 7 |
| 55 | Reserved = 00h | 1 |
| 56 to 62 | Write power settings at minimum recording velocity | 7 |
| 63 | Reserved = 00h | 1 |
| 64 | $T_{MP}$ write multi-pulse duration | 1 |
| 65 to 67 | $T_{top}$ first write pulse duration (for 2T, 3T & ≥4T) | 3 |
| 68 to 70 | $dT_{top}$ first write pulse start time (for 2T, 3T & ≥4T) | 3 |
| 71 | $T_E$ erase multi-pulse duration | 1 |
| 72 to 74 | $dT_E$ first erase pulse start time at nominal recording velocity (for 2T, 3T & ≥4T) | 3 |
| 75 to 77 | $dT_E$ first erase pulse start time at maximum recording velocity (for 2T, 3T & ≥4T) | 3 |
| 78 to 80 | $dT_E$ first erase pulse start time at minimum recording velocity (for 2T, 3T & ≥4T) | 3 |
| 81 to 111 | Reserved - All (00) | 31 |

FIG.3

RECORD CARRIER AND SCANNING DEVICE

The invention relates to an optical record carrier for recording user information and control information. The invention also relates to an optical scanning device for reading from and/or writing on such a record carrier. The invention also relates to a device for manufacturing such a record carrier.

Several types of optical record carriers, in particular optical record carriers of the write-once type such as the so-called CD-R and DVD+R and those of the rewritable type such as the so-called CD-RW and DVD+RW, require that so-called control information is embossed in the blank disc. This control information is used by a reading/writing device to control the processes of writing, reading and/or erasing of user information on the record carrier. The control information may include an identification of the type of record carrier; parameters of the record carrier, such as track pitch, reference velocity and diameter of a disc-shaped record carrier; parameter values for reading, writing and erasing, such as write power and waveforms of the write signal, read power and erase power, possibly for different positions on the record carrier and for different speeds; format of the user information; information on the protection of the user information, e.g. copy right information; information a bar code on the record carrier, such as its presence and the information on the structure of that bar code; table of contents of the user information. During a recording session information may be added to the block of control information on the record carrier, e.g. in the form of additional entries in the table of contents. The control information of a read-only record carrier is recorded on the record carrier during its manufacture. Also for record carriers of the write-once or rewritable type, part of the control information can be recorded on the record carrier during its manufacture.

The control information is stored on the record carrier in a certain pre-allocated area. If an information layer of the record carrier is provided with grooves along which a read head of the device can track, the control information can be recorded in wobbles of the grooves, also referred to as the wobble channel. Alternatively, it can be recorded in pits or other embossed structures or in user-writable marks, for instance in a pre-allocated area of the information layer. One of the first actions of a device when a new record carrier is inserted is to read the control information. From the control information, the device knows how to handle the specific record carrier.

The content of the control information may be different for different versions of a record carrier, e.g. for write-once and rewritable versions. A high-speed version of a record carrier may provide parameter values for multiple write methods defined for operation at lower and higher speeds.

While the content of the control information may change from one version to another, the format in which the control information is recorded on disc does preferably not change. Otherwise a scanning device does not know how to read the control information, because the version of the record carrier is not known before reading the control information.

The fixed format of the control information causes the following problem. On the one hand, the control information should be as short as possible in order to reduce the time needed to read the control information. When the control information is stored in the wobble channel or in auxiliary parts of the so-called ADIP of the rewritable DVD+RW, being channels having a low data rate on reading, the time needed to read the control information is relatively long. Also, a block of control information is usually written multiple times in series on a record carrier. This means that, if the control information is shorter the number of repetitions increases and the starting points of subsequent blocks are closer together. Hence, a read head that has been moved to a random position in an area filled with blocks will be closer to the start of a block, thereby reducing the time to access the start of a control information block. So, both access and read time will be reduced if the block of control information is made as short as possible. The total time required for accessing and reading the control information adds to the start-up time of the device and should thus be reduced as much as possible.

On the other hand the control information block should be sufficiently long to be able to contain all information necessary, not only in early versions of the disc but also in future versions of the disc such as high-speed or multiple-speed versions.

This dilemma is thus that the control information should on the one hand be as short as possible and on the other hand sufficiently long. The rewritable DVD+RW, for example, defines a control information block of 256 bytes, while in the first marketed version of DVD+RW only the first 57 bytes are used and the other 199 bytes are reserved for future use. This means an 'efficiency' in use of storage capacity in the block of 0.22 (57/256) and a possibility for adding up to a factor of 4.5 (256/57) extra information. The low efficiency also causes the access time to be unnecessarily long. The number of bytes is fixed at 256 and can not be modified if required in future versions for reasons presently unforeseen. In some formats error correction coding (ECC) is applied to the control information to increase its robustness. In that case all bytes of the control information block must be read to be able to retrieve the error correction information. Hence, a low efficiency causes a long read time.

It is an object of the invention to provide a record carrier that does not have the above disadvantages. Another object is to provide a scanning device for scanning such a record carrier. A further object is to provide a method of manufacturing such a record carrier.

The first object is achieved if the optical record carrier is adapted for storing user information and control information, the control information being arranged in a block of frames of equal length, the block including an identification of the total number of frames in the block. The identification may be in the form of a number representing the total number of frames. The adaptable number of frames in a block provides the required flexibility of the storage capacity for the control information. The equal length of the frames provides the standardized storage for easy information retrieval.

The total number of frames in a block is equal to at least one. The block of a first version of the record carrier having a relatively small amount of control information may contain one frame and, hence, can be accessed quickly. The length of a frame can be chosen to be relatively small, ensuring a high efficiency of the storage capacity. The number of frames can be made as large as required to store the control information of a second record carrier. Each block includes an indication of the number of frames in the block, thereby defining the extent of the control information. The indication may be stored in one of the frames of the block, preferably the first one. This frame may be provided with a unique identifier, informing the scanning device of the fact that this frame contains the indication.

Preferably, each frame includes the identification of the total number of frames in the block. After having read any one of the frames, the scanning device knows the number of frames in a block and can arrange for scanning said number of frames.

In a preferred embodiment of the record carrier, a sequence number is recorded in each frame, the sequence number representing the position of the frame within the block. The last sequence number is an indication of the number of frames in the block. The sequence number may be recorded without other indications of the number of frames or in addition to an indication of the total number of frames. A read head that has been moved to a random position in an area filled with blocks can read the sequence number of the frame. If a series of blocks are recorded on the record carrier, the device can continue to read the information in the subsequent frames until the next frame having the said sequence number. The device will then have read the complete control information stored in the block.

Preferably, each frame includes an identification of the type of control information recorded in the frame. If a device requires only a specific type of control information, e.g. copyright information, it can read only those frames containing this information.

To facilitate access to the control information, a series of blocks may be recorded consecutively. A read head randomly positioned in the area filled with blocks can start reading the frames without a need for searching for the start of the information.

The second object of the invention is achieved if an optical scanning device for reading an optical record carrier according to the invention, includes a read head and signal processing means for retrieving information from the record carrier, the processing means being adapted for reading the identification of the total number of frames in the block and reading control information in a number of frames equal to the total number. The access time of the scanning device for reading the is improved, because the device can start reading at the beginning of any frame within a block. The prior art device had to search for the start of the block to begin reading.

In a preferred embodiment of the scanning device, the processing means is adapted for reading the sequence number of a frame. The sequence number may be used to find the first frame of a block and start reading the control information in the block starting with that frame. It may also be used to read a series of consecutive frames starting with an arbitrary sequence number and ending with the last frame before the frame having the same sequence number.

To allow a scanning device to read control information of a specific type, the processing means is preferably adapted for reading the identification of the type of control information recorded in the frame.

The third object of the invention is met if a method for manufacturing a record carrier for storing user information and control information includes the step of recording the control information arranged in a block of frames of equal length, each block including an identification of the total number of frames in the block. The number of frames in a block is equal to one or more. Whereas a scanning device can write the control information in the block structure using user-written marks, it is also possible to make the block structure an indelible part of the record carrier by recording the block structure including the subdivision in frames and the identification of the number of frames in a block during the manufacture of the record carrier e.g. using embossing. The method for manufacturing the optical record carrier may be a conventional manufacturing method, however, controlled to provide the pattern of marks that represent the block structure according to the invention or to provide the wobble that represents the block structure.

The objects, advantages and features of the invention will be apparent from the following more particular description of preferred embodiments of the invention, as illustrated in the accompanying drawings, in which FIG. 1 shows a record carrier according to the invention;

FIG. 3 shows a frame in which control information is recorded;

Figure 1:
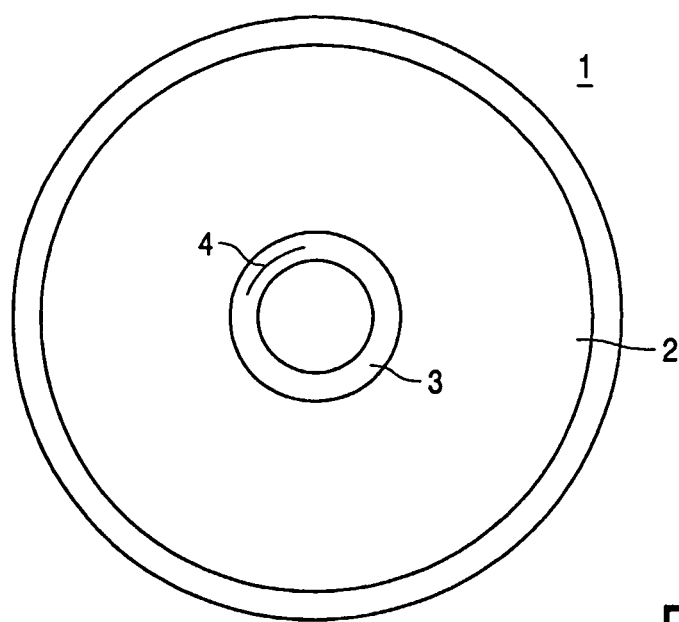

FIG. 1 shows an embodiment of the optical record carrier 1 according to the invention. Although the embodiment shown has a disc shape, the record carrier may have any shape, e.g. a rectangular card. The record carrier comprises an area 2 for recording user information and an area 3 for recording control information. The information may be recorded in spiral tracks starting at the inner radius of area 2 and ending at the outer radius of area 3. A short part 4 of a track is shown in the Figure. Although area 2 in the Figure is located at the inner radius of the recordable area of the record carrier, it may be at any pre-allocated area on the recordable area, e.g. at the outer radius of the recordable area.

Figure 2:
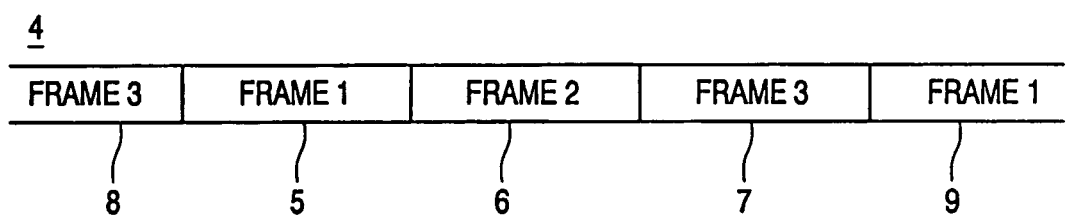
FIG. 2 shows a part of a track including blocks of control information.

FIG. 2 is an enlargement of part 4 of a track. It shows a block of control information containing three frames 5, 6 and 7, having sequence numbers 1, 2 and 3, respectively. Identical blocks are stored consecutively in the track. The Figure shows frame 3 of the preceding block and frame 1 of the subsequent block, indicated in the Figure by the reference numbers 8 and 9.

FIG. 3 shows the structure of the frame 1 of the block as used in the so-called DVR type of record carrier. The length of a frame is 112 bytes. Bytes 0 and 1 indicate that the frame contains control information of the type Disc Information. Frames in other embodiments of the record carrier may have an identifier for copy right information or error-correction information. Byte 4 indicates the number of frames in the block, three in this embodiment, and byte 5 indicates the sequence number of the frame within the block.

The embodiment shows that the flexibility of the frame structure for the control information has two aspects. In the first place, frames have a fixed length but the number of frames is not fixed. Every frame starts with a short header that describes the total number of frames in the control information block and it provides the sequence number of this specific frame in the block. In the second place, the header of each frame also includes an identifier indicating the type of information contained in that specific frame. The identifier could, for example, be "DI" to indicate Disc Information, or "CP" to indicate information for copy protection.

By using this flexible frame structure, the length of the control information block can be limited to what is needed for every version of the record carrier, while at the same time it remains possible to extend the amount of control information in future versions and even extend to different types of information beyond disc information.

The frames implemented in the DVR format have only control information of the DI type with only 1 frame per block. The structure of each frame is the same as that of the frame shown in FIG. 3, except that byte 4 has the value of one. The maximum number of frames in this format preferably equals 32, to have a reasonable number of repetitions of the block in area 2, preferably more than 5. In the control information frame 75 out of 112 bytes are used and 37 bytes reserved. Hence, the efficiency equals 0.67 (=75/112), compared to only 0.22 for DVD+RW. The DVR format has a possibility to extend by of a factor 48 (=32*112/75), compared to only 4.5 for DVD+RW.

Figure 4:
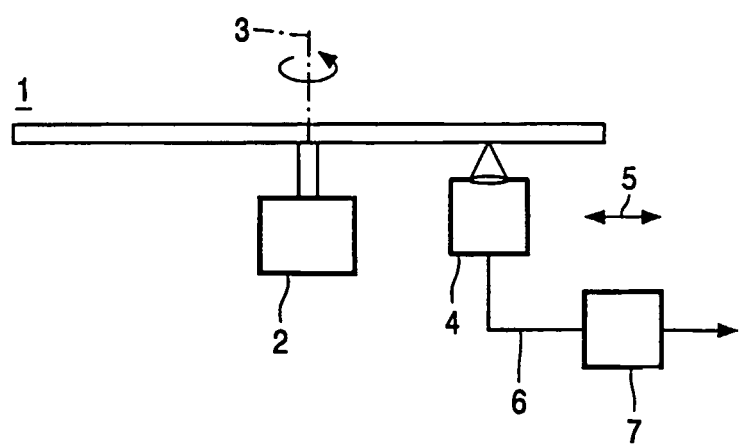
FIG. 4 shows a scanning device according to the invention.

FIG. 4 is a schematic representation of an optical scanning device according to the invention. A rotation motor 2 rotates record carrier 1 an axis 3. An optical head 4 can be moved in the radial direction indicated by the arrow 5. The rotation of the record carrier and the translation of the optical head allow accessing any position on the record carrier. Optical head 4 is connected to a signal processing unit 7 to transmit signals between the optical head and the processing unit. The signal include signals for setting the power of the radiation beam emitted by a laser in the optical head and used for scanning the record carrier, signals from detectors arranged in the radiation beam reflected by the record carrier and modulated by the information in the record carrier, signals representing tracking errors of the radiation beam, signals and signals for actuators to control the position of the radiation beam with respect to the record carrier. The processing unit controls the read, write and erase processes of the optical head by controlling the power of the radiation beam and the position of the optical head with respect to the record carrier.

Before the scanning device starts to read, write or erase on a record carrier inserted into the scanning device, it will read the control information stored on the record carrier. Thereto, the optical head is positioned in area 2 comprising the blocks with control information. It starts reading in a track on which the radiation beam is focussed. The position within the track can be derived from address information recorded in the wobble channel of the track or in the frames or from the presence of unique identifiers recorded in the information identifying the start of a frame. The processing unit derives the number of frames in a block from byte 4 of the frame. The position of the number in the frames is known because of the fixed format of each frame. The processing unit can use the number of frames for reserving memory in the device for storing the control information. The sequence number of the frame is also read from the frame. The device will read the subsequent frames recorded in the track, until the frame having the same sequence number as the first-read sequence number. The series of frames read will contain all control information of the control information block. The processing unit may arrange the information in the order of the sequence number. In another mode, the scanning device must be provided with control information of a specific type, e.g. copy right information. The scanning head will read frames and retrieve the information type of each frame. It will read the control information of the frame that has the correct information type.

During a write action, the scanning device can amend the control information or add new information, e.g. by changing parameter values or adding entries to the table of contents.

The invention claimed is:

1. A non-transitory computer readable medium encoded with a data structure storing user information and control information, the control information being arranged in a block of frames, wherein each frame includes at least a first byte number, the first byte number of at least one of the frames of the block being encoded for providing an identification of a total number of frames in the block, and each frame includes at least a second byte number, the second byte numbers being encoded to indicate sequence numbers of the frames, wherein the second byte number includes a sequence number recorded in each frame, the sequence number representing a position of the frame within the block.

2. The computer readable medium of claim 1, wherein at least one of the frames in the block includes an identification of a type of the control information recorded in the frame.

3. The computer readable medium of claim 1, on which a series of blocks having identical control information is recorded.

4. An optical scanning device for reading the computer readable medium of claim 1, including a read head and signal processor for retrieving information from the record carrier, the processor being adapted for reading the identification of the total number of frames in the block and reading the control information in a number of frames equal to the total number.

5. The optical scanning device according to claim 4 for reading the optical record carrier, wherein the processor is adapted for reading the sequence number of the frame.

6. The optical scanning device according to claim 4 for reading the optical record carrier, wherein the processor is adapted for reading the identification of a type of control information recorded in the frame.

7. A non-transitory computer readable medium encoded with a data structure storing user information and control information, the control information being arranged in a block of frames of equal length, wherein each frame includes at least a first byte number, the first byte number of at least one of the frames of the block being encoded for providing an identification of a total number of frames in the block, and at least a second encoded byte number, the second byte numbers being encoded to indicate sequence numbers of the frames, wherein the second byte number includes a sequence number recorded in each frame, the sequence number representing a position of the frame within the block.

8. The computer readable medium of claim 7, wherein the last sequence number identifies the total number of frames in a block.

9. The computer readable medium of claim 7, wherein at least one of the frames in a block includes an identification of a type of the control information recorded in the frame.

10. The computer readable medium of claim 7, on which a series of blocks having identical control information is recorded.

11. An optical scanning device for reading the optical record carrier of claim 7, including a read head and signal processor for retrieving information from the record carrier, the processor being adapted for reading the identification of the total number of frames in the block and reading the control information in a number of frames equal to the total number.

12. The optical scanning device according to claim 11 for reading the optical record carrier, wherein the processor is adapted for reading the sequence number of the frame recorded in the frame.

13. The optical scanning device of claim 11 for reading the optical record carrier, wherein the processor is adapted for reading the identification of a type of the control information recorded in the frame.

14. A method for manufacturing a non-transitory computer readable medium encoded with a data structure for storing user information and control information, including the act of recording the control information arranged in a block of frames of equal length, wherein each frame includes at least a first byte number, the first byte number of at least one of the frames being encoded for providing an identification of a total number of frames in the block, and at least a second encoded byte number, the second byte numbers being encoded to indicate sequence numbers of the frames, wherein the second byte number includes a sequence number recorded in each frame, the sequence number representing a position of the frame within the block.

15. The method of claim 14, wherein a last sequence number identifies the total number of frames in the block.

16. The method of claim 14, wherein at least one of the frames in the block includes an identification of a type of the control information recorded in the frame.

17. The method of claim 14, further comprising the act of recording a series of blocks having identical control information.

18. A method of storing information on a non-transitory computer readable medium encoded with a data structure comprising the act of recording control information arranged in a block of frames of equal length, wherein each frame includes at least a first byte number, the first byte number of at least one of the frames of the block being encoded for providing an identification of a total number of frames in the block, and each frame includes at least a second byte number, the second byte numbers being encoded to indicate sequence numbers of the frames, wherein the second byte number includes a sequence number is recorded in each frame, the sequence number representing a position of the frame within the block.

19. The method of claim 18, wherein a last sequence number identifies the total number of frames in the block.

20. The method of claim 18, wherein at least one of the frames in the block includes an identification of a type of the control information recorded in the frame.

21. The method of claim 18, further comprising the act of recording a series of blocks having identical control information.

* * * * *